F. H. MARTIN.
SCALE SCOOP.
APPLICATION FILED AUG. 30, 1911.
1,029,138.
Patented June 11, 1912.
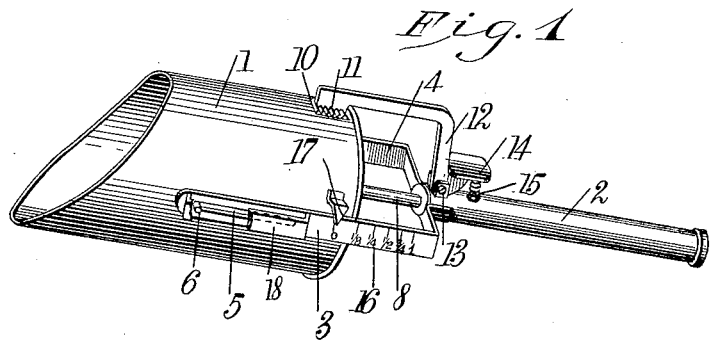
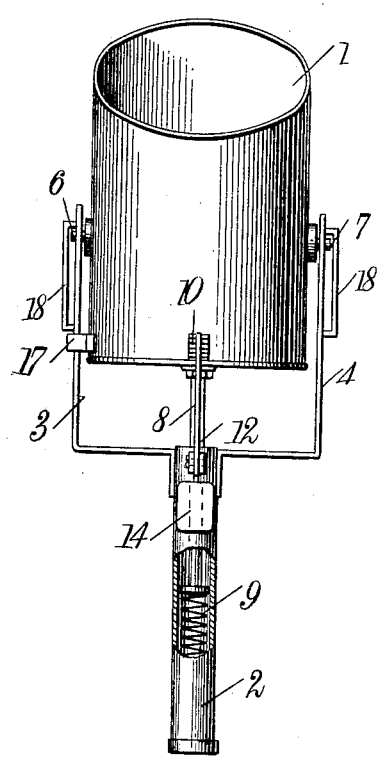
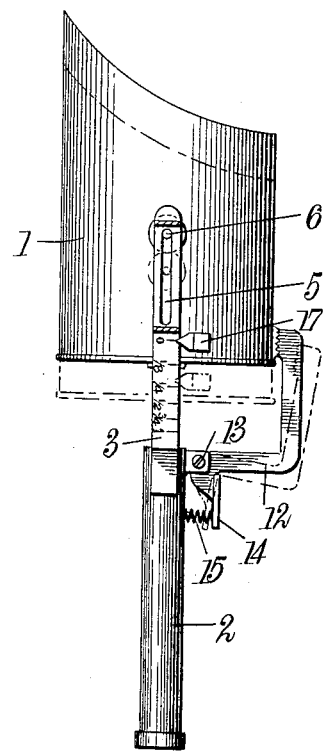
WITNESSES
F. E. Alexander
L. J. Gallagher
INVENTOR
Frank H. Martin
BY Munn & Co
ATTORNEYS

UNITED STATES PATENT OFFICE.

FRANK HENRY MARTIN, OF SAN FRANCISCO, CALIFORNIA.

SCALE-SCOOP.

1,029,138. Specification of Letters Patent. Patented June 11, 1912.

Application filed August 30, 1911. Serial No. 646,794.

*To all whom it may concern:*

Be it known that I, FRANK HENRY MARTIN, a citizen of the United States, and a resident of San Francisco, in the county of San Francisco and State of California, have invented a new and Improved Scale-Scoop, of which the following is a full, clear, and exact description.

My invention relates generally to scoops and more particularly to scale scoops wherein the amount of material contained within the scoop may be indicated.

The object of my invention is to provide a scale scoop having means thereon adapted to contain a quantity of material, other means being provided whereby when the scoop is held in vertical position, the mass of material contained therein may be indicated.

A further object of my invention is to provide a scoop having a handle movably connected thereto, the handle acting as a support for the scoop, there being a gage on the handle along which a member on the scoop is movable to different positions depending on the mass of material within the scoop whereby the said mass may be weighed or indicated.

A further object of my invention is to provide a scale scoop made up of a handle and a receptacle, the two parts being movably connected together, there being suitable means for holding the receptacle rigid with respect to the handle whereby a suitable quantity of material may be inserted into the receptacle, the said means being movable in order to permit the receptacle to move relatively to the handle to weigh the said material and indicate the weight thereof.

Reference is to be had to the accompanying drawings, forming a part of this specification, in which similar characters of reference denote corresponding parts in all the views, and in which—

Figure 1 is a perspective view of the scoop; Fig. 2 is a plan view thereof; Fig. 3 is a side view, the position of the parts when the scoop is indicating the amount of material carried thereby being shown in dotted lines.

The device is made up of a receptacle 1 of any suitable form of cross section or volume, together with a handle 2 having a bifurcated end portion comprising arms 3, 4, each arm being provided at its outer end with a slot 5 engaging the pins 6, 7, carried at opposite sides of the receptacle 1.

A rod 8 extends rearwardly from the back of the scoop and into the handle 2, the end of the rod being in engagement with a helical spring 9 within the handle; adjacent the top of the receptacle 1 a number of teeth or serrations 10 are provided which engage with similar teeth or serrations 11 at the outer end of a bell crank lever 12 which is pivoted at 13 to one end of the handle 2, the lever being provided with a thumb rest 14, there being a suitable spring 15 engaging the thumb rest and the handle.

Along either one of the arms 3, 4, a number of scale divisions 16 are provided which indicate ounces or pounds or fractions thereof, there being an index 17 on the side of the scoop which is movable along either one of the arms and which indicates the mass of material within the receptacle 1 by pointing to any one of the scale divisions.

When the scoop is in use in obtaining a quantity of material within the receptacle from a bin or barrel, movement of the receptacle relatively to the handle 2 is prevented by reason of the engaging teeth 10, 11 on the scoop and the bell crank 12. The zero mark on the scale 16 is positioned so that when the scoop is held in an upright position and the receptacle is empty, the index 17 will coincide with this zero graduation. After a quantity of material has been inserted into the receptacle 1, the mass of that material is indicated by movement of the receptacle between the arms 3, 4, the pins 6, 7 moving in the grooves 5. The helical spring 9 is of such material and resiliency that it is expanded more or less depending on the material contained within the receptacle, the amount of the material being indicated by pressing downwardly on the thumb rest 14, thereby carrying the teeth 10, 11 out of engagement. Of course the series of graduations 16 will depend on the size of the scoop and the material which it is designed to handle along with the volume of the receptacle 1, these graduations being marked thereon in advance so that the compression of the spring 9 is proportionate to the mass of the material in the receptacle. After the material has been weighed it is emptied from the receptacle, and due to the expansion of the spring 9, the receptacle will come back to the position shown in Fig. 1. By releasing pressure on the thumb rest, the teeth 10, 11 will again come into engagement and the scoop into position to take out more material from the barrel or other source of supply. The pins 6 and 7 are protected by means of a plate 18 rigidly mounted on the arms 3 and 4.

Of course the material of which the scoop is made may be anything suited to the purpose and the size and shape of the parts may be determined by the use to which the device is to be put, such modifications being embraced within the spirit and scope of my invention as defined in the appended claim.

Having thus described my invention, I claim as new, and desire to secure by Letters Patent:—

A device of the class described comprising a handle having arms at one end thereof, grooves adjacent the outer ends of the said arms, a receptacle having pins at opposite sides thereof positioned between the arms, the said pins engaging in the said grooves, a series of graduations on one of the arms, an index on the scoop and movable along the graduations, a rod extending rearwardly of the scoop and into the handle, a spring contained within the handle and engaging the end of the said rod, a lever pivoted to the handle and having the thumb rest at one end thereof, the other end of the lever being provided with a number of teeth, a number of teeth carried by the receptacle adapted to engage the teeth on the lever, and a spring engaging the said thumb rest and the handle whereby the said teeth may be held in engagement with each other when the scoop is being filled, movement of the thumb rest carrying the teeth out of engagement whereby the mass of material within the receptacle may be engaged by the said index and graduations.

In testimony whereof I have signed my name to this specification in the presence of two subscribing witnesses.

FRANK HENRY MARTIN.

Witnesses:
CHARLES R. HOLTON,
JOHN R. BRIDE.

---

Copies of this patent may be obtained for five cents each, by addressing the "Commissioner of Patents, Washington, D. C."